United States Patent
Van Der Veidt et al.

(10) Patent No.: US 11,540,526 B2
(45) Date of Patent: Jan. 3, 2023

(54) METHOD TO EVISCERATE POULTRY, A PRE-EVISCERATION DEVICE, AN EVISCERATION SYSTEM, AND A COLLECTOR DEVICE

(71) Applicant: PMJ GROUP B.V., N Opmeer (NL)

(72) Inventors: Cornelis Bastiaan Van Der Veidt, KJ Opmeer (NL); Egbertus Martinus Joosten, KJ Opmeer (NL)

(73) Assignee: PMJ GROUP B.V., Opmeer (NL)

( * ) Notice: Subject to any disclaimer, the term of this patent is extended or adjusted under 35 U.S.C. 154(b) by 0 days.

(21) Appl. No.: 17/616,945

(22) PCT Filed: Jun. 13, 2020

(86) PCT No.: PCT/EP2020/066417
§ 371 (c)(1),
(2) Date: Dec. 6, 2021

(87) PCT Pub. No.: WO2020/249810
PCT Pub. Date: Dec. 17, 2020

(65) Prior Publication Data
US 2022/0211054 A1   Jul. 7, 2022

(30) Foreign Application Priority Data
Jun. 13, 2019   (EP) .................................... 19180134

(51) Int. Cl.
*A22C 21/00*   (2006.01)
*A22C 21/06*   (2006.01)

(52) U.S. Cl.
CPC .......... *A22C 21/06* (2013.01); *A22C 21/0092* (2013.01)

(58) Field of Classification Search
CPC ............................ A22C 21/06; A22C 21/0092
USPC ........................................................ 452/108
See application file for complete search history.

(56) References Cited

U.S. PATENT DOCUMENTS

| | | | |
|---|---|---|---|
| 3,685,096 A | 8/1972 | Harben, Jr. | |
| 4,184,230 A | 1/1980 | Fox et al. | |
| 4,517,207 A * | 5/1985 | Kress ................. | A22C 21/0069 426/480 |

(Continued)

FOREIGN PATENT DOCUMENTS

| | | |
|---|---|---|
| EP | 0432317 A1 | 6/1991 |
| JP | 5701692 B2 | 4/2015 |
| NZ | 579555 A | 6/2012 |

OTHER PUBLICATIONS

International Search Report and Written Opinion issued in corresponding International Patent Application No. PCT/EP2020/066417, dated Jan. 19, 2021 (18 pages).

*Primary Examiner* — Richard T Price, Jr.
(74) *Attorney, Agent, or Firm* — Osha Bergman Watanabe & Burton LLP

(57) ABSTRACT

A method to eviscerate poultry, in particular waterfowl such as ducks, having a carcass with a body, neck and head is disclosed. The method involves damaging skin of the poultry at a back side of the neck of the poultry, damaging an esophagus of the poultry at or near the head of the poultry, removing skin from the neck of the poultry in which the esophagus is removed along with the skin, and removing a viscera pack from the poultry along with the esophagus removed from the neck of the poultry. Further, a collector device for collecting a viscera pack of poultry is also disclosed.

16 Claims, 15 Drawing Sheets

(56) References Cited

U.S. PATENT DOCUMENTS 4,587,690 A * 5/1986 Kress .................... A22C 21/00
452/106
5,707,280 A    1/1998 Tieleman et al.

* cited by examiner

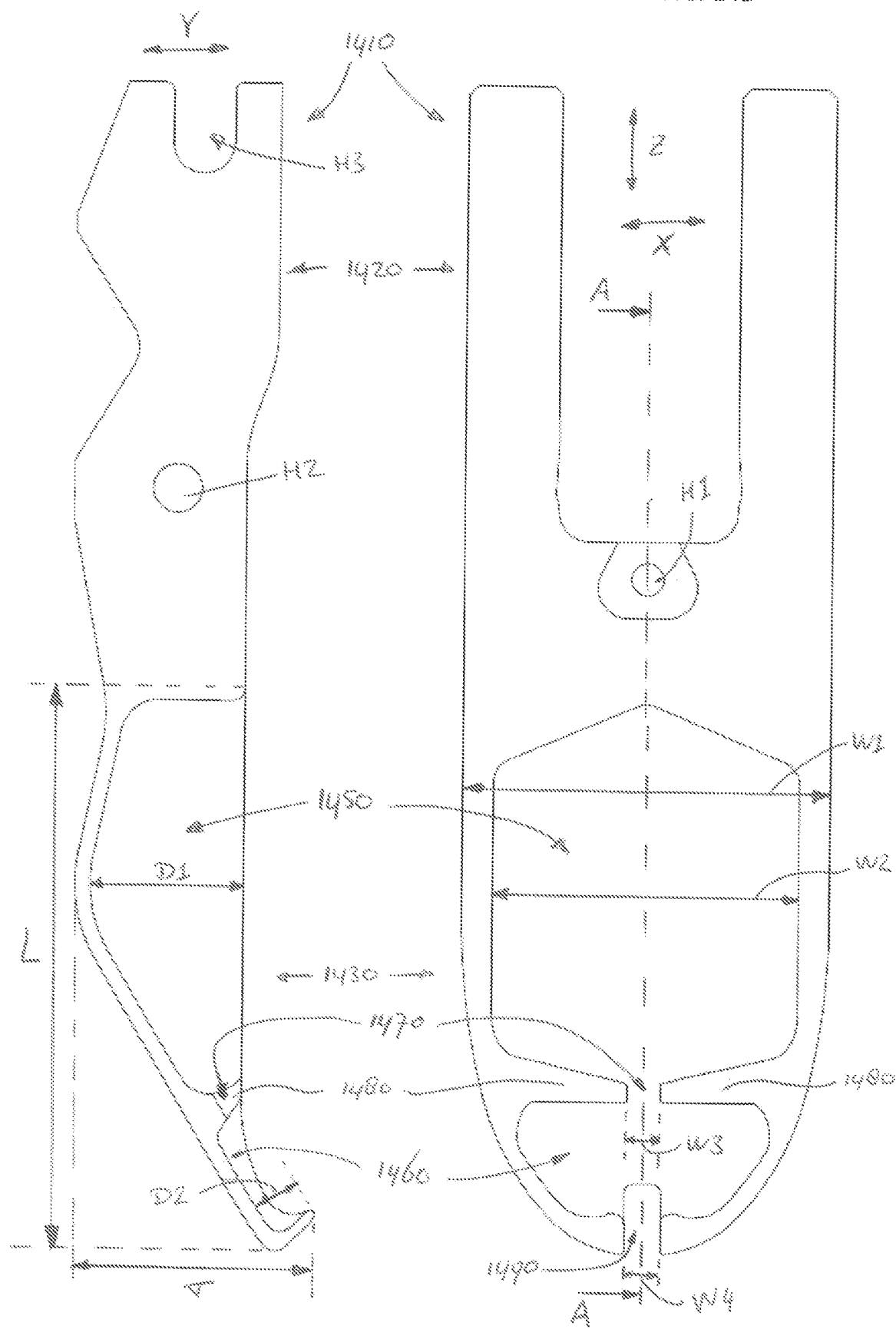

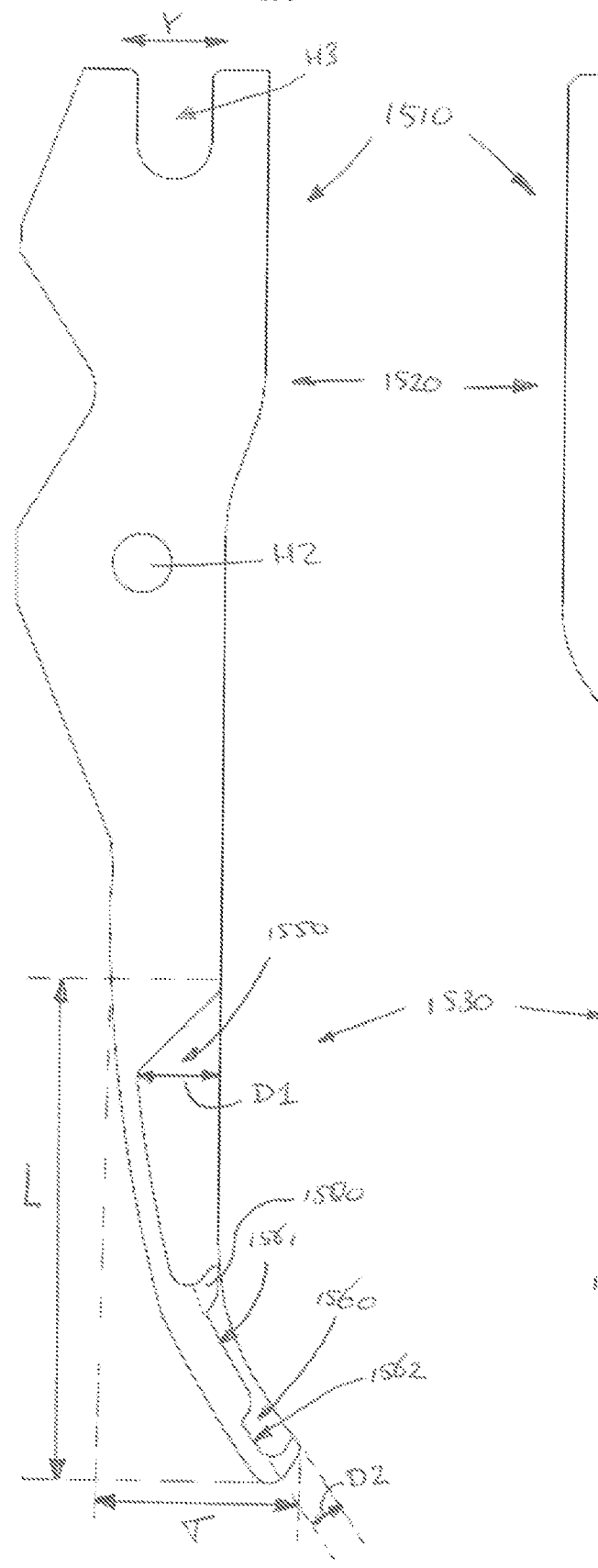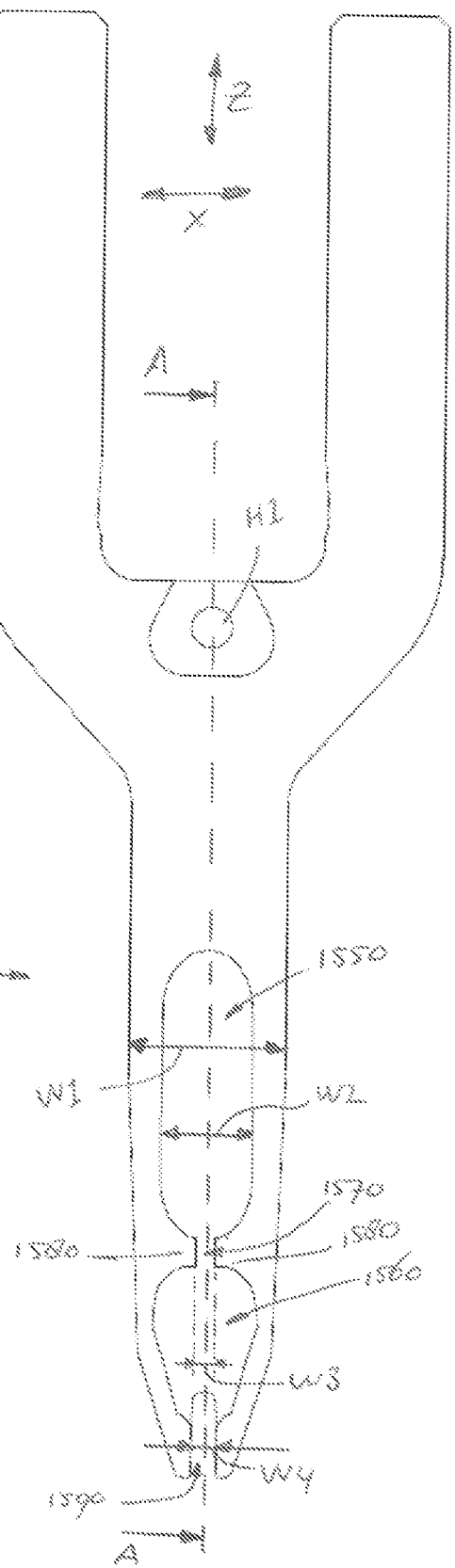

METHOD TO EVISCERATE POULTRY, A PRE-EVISCERATION DEVICE, AN EVISCERATION SYSTEM, AND A COLLECTOR DEVICE

BACKGROUND OF THE INVENTION

The invention relates to a method for eviscerating poultry, in particular waterfowl such as ducks, and devices and systems to carry out such methods or parts thereof.

In a known method, the poultry includes a carcass with a body, neck and head, wherein a collector device is inserted at a vent end of the body to engage with a viscera pack, e.g. including heart, crop, stomach, liver, intestines, etc., inside a body cavity, and wherein the collector device is subsequently retracted to remove said viscera pack from the body cavity.

It is preferred that the esophagus is removed along with the viscera pack from the body cavity, but a disadvantage of the current method is that the esophagus is uncontrollably removed or remains at least partially in the poultry.

SUMMARY OF THE INVENTION

In view of the above it is an object of the invention to provide a method for eviscerating poultry in which the esophagus is controllably and thus more reliably removed from the poultry.

According to a first aspect of the invention, there is provided a method to eviscerate poultry, e.g. waterfowl such as ducks, having a carcass with a body, neck and head, said method comprising the following steps:
  a. damaging skin of the poultry at a back side of the neck of the poultry;
  b. damaging an esophagus of the poultry at or near the head of the poultry;
  c. removing skin from the neck of the poultry in which the esophagus is removed along with the skin; and
  d. removing a viscera pack from the poultry along with the esophagus removed from the neck of the poultry in step c.

The first aspect of the invention is based on the insight of the inventors that the esophagus can be controllably and more reliably removed from the poultry by first separating the esophagus from the neck of the poultry, which esophagus can easily be separated from the neck by removing the skin from the neck, and that subsequently pulling on the esophagus when removing the viscera pack results in a peeling of the esophagus from the skin without breaking of the esophagus. A further advantage of this method may be that the neck and head are prepared at the same time for further processing, e.g. removing meat from the neck.

It is explicitly noted here that the use of the word damaging refers to any process in which the part that is damaged is sufficiently weakened. Hence, for the skin this should be interpreted such that when skin is removed from the neck the skin tears apart or is already torn apart at the damaged location and skin can be removed along both sides of the neck. For the esophagus this should be interpreted such that when the skin is removed from the neck along with the esophagus, the esophagus breaks or is already broken at the damaged location.

In an embodiment, step a. comprises the step of making a cut or slit in the skin in a direction parallel to a longitudinal direction of the neck of the poultry. An advantage thereof is that removing the skin at both sides of the neck is possible over (nearly) the entire length of the neck resulting in more reliable removal of the skin and esophagus.

In an embodiment, a length of the cut or slit in the skin is at least 30% of a length of the neck, preferably at least 50% of the length of the neck, more preferably at least 60% of the length of the neck, and most preferably at least 75% of the length of the neck.

In an embodiment, step b. comprises the step of making a cut or slit at a front side of the neck of the poultry in a direction perpendicular to a longitudinal direction of the poultry.

In an embodiment, in step c. after removing the skin from the neck, any remaining tissue connections between skin and neck other than esophagus are severed. Severing the remaining tissue connections between skin and neck may be advantageous as it results in a more reliable peeling of the esophagus from the skin. Severing can be done in a variety of ways, including but not limited to:
  pulling the skin and neck away from each other, including pulling the skin away from the neck, pulling the head or neck away from the skin, or a combination thereof;
  moving a severing member in between the skin and neck thereby breaking or cutting any remaining tissue connections; and
  burning away or chemically attacking the remaining tissue connections.

In an embodiment, during step c. the head of the poultry is fixated or at least movement of the head is limited so that the skin can be removed from the neck. Fixating or limiting the movement of the head is preferably done in a direction parallel to the neck and preferably also in a direction of removal of the skin from the neck that is perpendicular to the neck thereby allowing to make sufficient space between skin and neck.

In an embodiment, in step b. the trachea is also damaged, wherein preferably in step c. the trachea is also pulled along with the skin. It may be advantageous to combine the removal of the trachea with the removal of the esophagus, especially when they are located close to each other in the poultry. However, it is also possible that the trachea and the lungs are removed at another time during processing of the carcass.

The first aspect of the invention further relates to a pre-eviscerating system for preparing poultry, in particular waterfowl, e.g. a duck, having a carcass with body, neck and head for evisceration, said pre-eviscerating system comprising:
  a first cutting device for damaging skin of the poultry at a back side of the neck of the poultry;
  a second cutting device for damaging an esophagus of the poultry at or near the head of the poultry; and
  a skinning device for removing skin from the neck of the poultry thereby pulling the esophagus along with the removed skin.

The first aspect of the invention also relates to an evisceration system for eviscerating poultry, in particular waterfowl, e.g. a duck, having a carcass with body, neck and head, said system comprising:
  a first cutting device for damaging skin of the poultry at a back side of the neck of the poultry;
  a second cutting device for damaging an esophagus of the poultry at or near the head of the poultry;
  a skinning device for removing skin from the neck of the poultry thereby pulling the esophagus along with the removed skin; and an eviscerating device for removing a viscera pack from the poultry along with the esophagus removed along with the skin in the skinning device.

In an embodiment, the first cutting device and the second cutting device are combined in a single cutting machine.

According to a second aspect of the invention, there is provided a collector device for collecting a viscera pack from poultry, in particular waterfowl, e.g. having a carcass with body, said collector device comprising:
 a manipulation part to move and position the collector device relative to the poultry; and
 a collector part arranged opposite to the manipulation part to engage with the viscera pack of the poultry,
wherein the collector part includes a first recess and a second recess, said first and second recess being aligned in a longitudinal direction of the collector device with the first recess being arranged closer to the manipulation part than the second recess, and wherein the collector part further includes a bridging recess in a wall between the first and second recess extending from the first recess to the second recess.

In an embodiment, the wall between the first and second recess extends in a width direction of the collector device perpendicular to the longitudinal direction of the collector device, which longitudinal direction may alternatively be referred to as length direction. The width direction may alternatively be referred to as transverse direction.

A thickness direction may be defined as a direction perpendicular to both the longitudinal direction and the width direction of the collector device.

As will be clear for a skilled person, dimensions such as length, width and thickness are respectively in the longitudinal direction, width direction and thickness direction. In contrast to thickness, a depth of a feature may be a dimension along a direction perpendicular to a plane defined by the feature or immediate surroundings.

In an embodiment, the collector part has a length between 120-200 mm, preferably between 130-190 mm, and more preferably between 135-185 mm.

In an embodiment, the collector part has a width between 30-150 mm, preferably between 35-135 mm, and more preferably between 40-120 mm.

In an embodiment, the collector part has a thickness between 40-90 mm, preferably between 50-80 mm, and more preferably between 52 and 79 mm.

In an embodiment, the first recess has a depth between 10-70 mm, preferably between 15-60 mm, and more preferably between 20-50 mm.

In an embodiment, the second recess has a depth between 5-20 mm, preferably between 7-17 mm, and more preferably between 9-14 mm.

In an embodiment, the first recess has a width between 15-130 mm, preferably between 20-115 mm, and more preferably between 24-100 mm.

In an embodiment, the bridging recess has a width of 4-15 mm, preferably 6-12 mm.

Where appropriate, the above described features may be combined and allow the collector device to be optimized for a particular size range of the poultry processed using the collector device. Hence, it is possible to optimize the collector device for specific species of poultry, but also for different size ranges within a single species of poultry.

In an embodiment, the collector part further includes a slit at a free end of the collector part that extends in the longitudinal direction of the collector device from the free end into the second recess.

In an embodiment, the slit has a width of 4-15 mm, preferably 6-12 mm. Preferably, the width of the slit is substantially equal to the width of the bridging recess.

In an embodiment, the wall between the first and second recess forms a V-shaped side wall of the first recess.

In an embodiment, the second recess includes a first position having a first depth and a second portion having a second depth, wherein the first depth is smaller than the second depth, and the first portion is closer to the first recess than the second portion. The second portion preferably includes a portion of the aforementioned slit at the free end, i.e. the slit does not extend into the first portion, so that the slit extends from the free end into the second portion of the second recess only.

In an embodiment, the first depth is at most 80% of the second depth, preferably at most 70%, more preferably at most 60%, and most preferably at most 50%.

In an embodiment, the edges of the collector part engaging with the poultry are rounded It is explicitly mentioned here that the first and second aspect of the invention may be combined with each other. For instance, the collector device according to the second aspect of the invention may be used in the evisceration system according to the first aspect of the invention to remove the viscera pack from the poultry.

BRIEF DESCRIPTION OF THE DRAWINGS

The invention will now be described in a non-limiting way with reference to the accompanying drawings in which like parts are indicated by like reference symbols, and in which:

FIG. 14A schematically depicts a cross-sectional view of a collector device of an eviscerating device according to another embodiment;

FIG. 14B schematically depicts a front view of the collector device of FIG. 14A;

FIG. 15A schematically depicts a cross-sectional view of a collector device of an eviscerating device according to a further embodiment; and FIG. 15B schematically depicts a front view of the collector device of FIG. 15A.

DETAILED DESCRIPTION OF THE INVENTION

Figure 1:
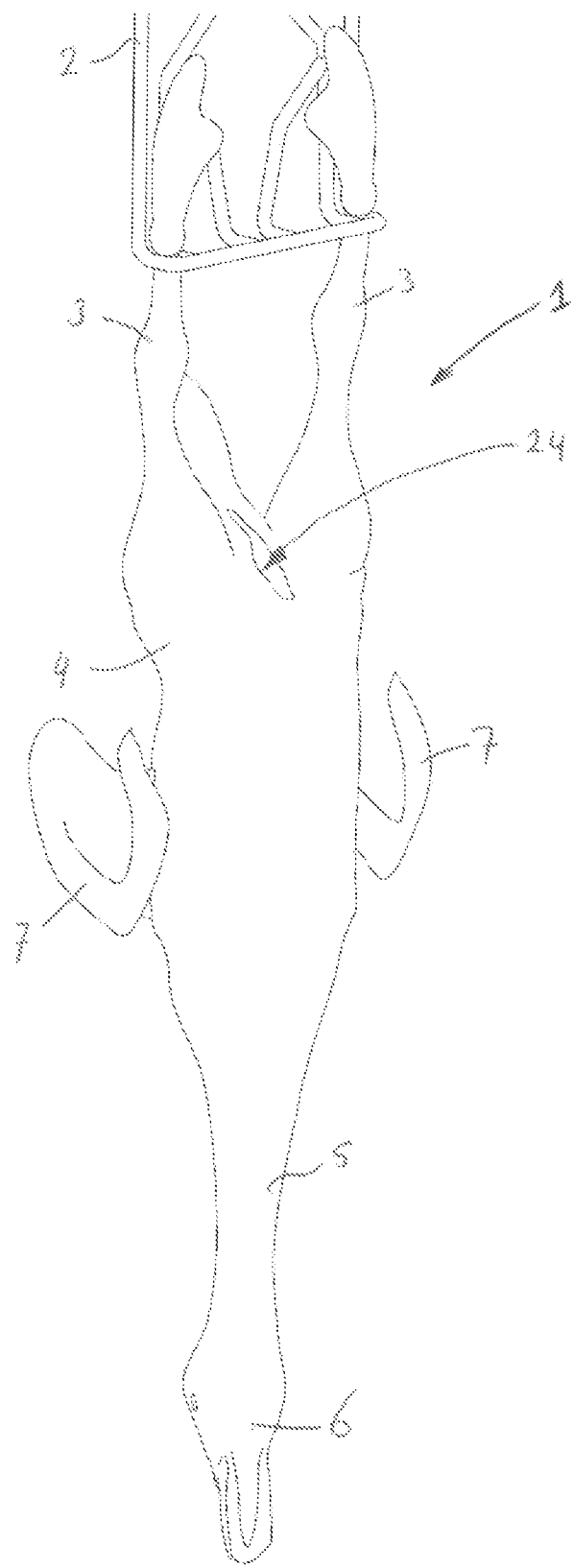
FIG. 1 schematically depicts a perspective view of a duck suspended upside down before being subjected to a method according to an embodiment of the first aspect of the invention.

FIG. 1 schematically depicts a perspective view of a duck 1 suspended upside down (i.e. head down) before being subjected to a method according to an embodiment of a first aspect of the invention.

The duck 1 has a carcass with legs 3, body 4, neck 5, head 6 and wings 7. The duck 1 is suspended by its legs 3 in a poultry shackle 2 as is known in the art to be transported along various processing devices, which may be configured to carry out one or more of the following processes:
  live bird handling;
  killing;
  plucking;
  waxing;
  eviscerating;
  chilling;
  grading;
  cut-up; and
  packing.

Although the abovementioned processes may be carried out automatically using the aforementioned processing devices, the processes may also be carried out manually and/or may be present in a processing line but may be allowed to be by-passed when necessary, e.g. depending on the state of the poultry as provided.

The description below will focus on the eviscerating process. It is noted that for the first aspect of the invention it is important that the poultry, in this case the duck 1, is provided as a carcass with a body 4, neck 5 and head 6 with a viscera pack inside a body cavity as will be explained below by reference to FIG. 2. The presence of legs 3 or wings 7 is not essential to the invention.

Figure 2:
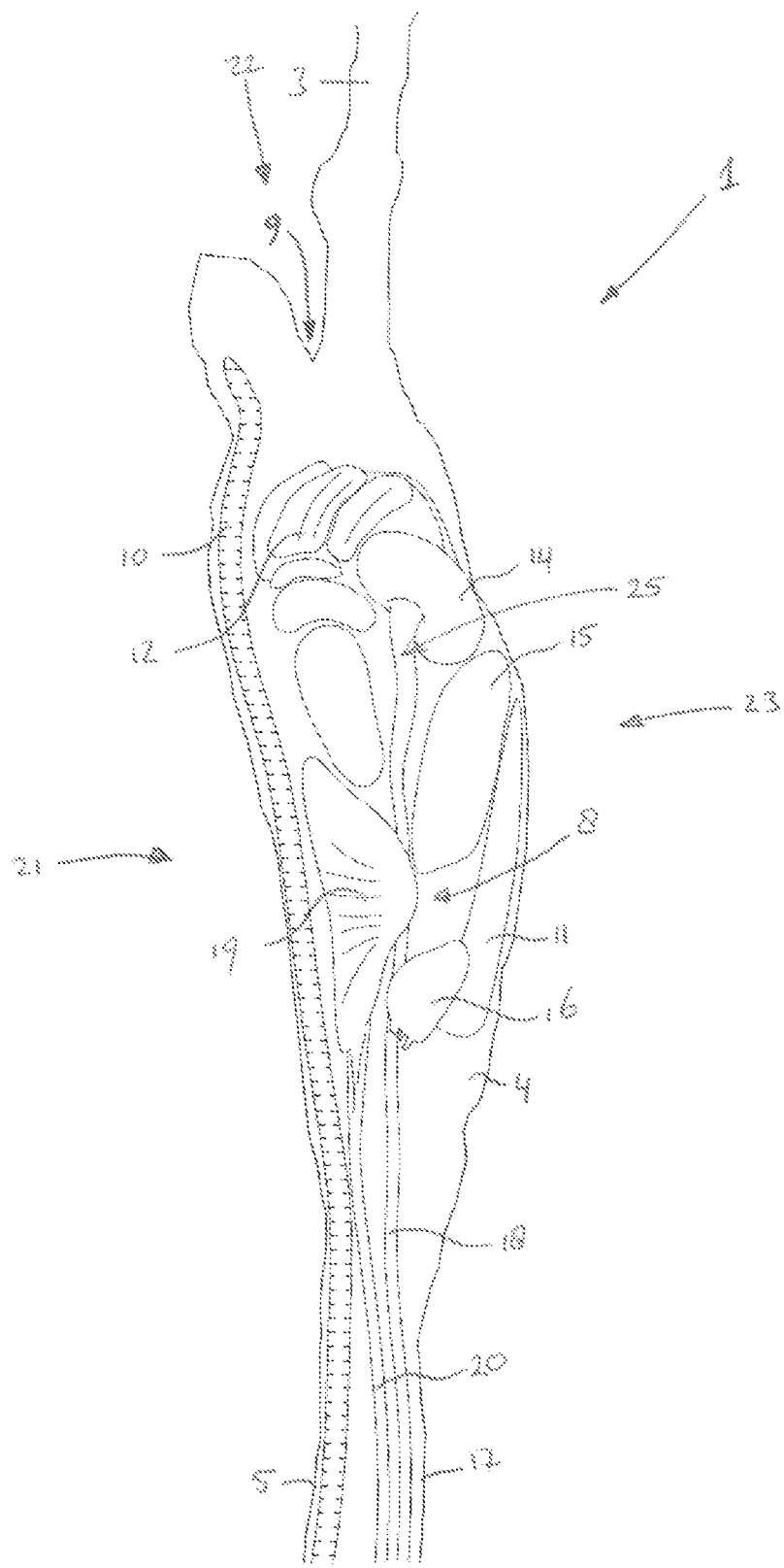
FIG. 2 schematically depicts a cross-section of the duck of FIG. 1.

FIG. 2 schematically depicts a cross-section of the duck 1 of FIG. 1. The cross-section depicts the median plane of the duck 1 through the center of the duck 1. Part of the leg 3 and the head 6 are not visible in FIG. 2. The following parts are provided with reference numerals:
  leg 3
  body 4
  neck 5
  body cavity 8
  vent or cloaca 9
  vertebrae 10
  breast fillet meat 11
  intestines 12
  gizzard 14
  liver 15
  heart 16
  neck skin 17
  esophagus 18
  lungs 19
  trachea 20

The entirety of organs is identified as the viscera pack 25 of which most is located in the body cavity 8. The back side of the duck 1 is indicated using reference numeral 21, the vent end of the duck 1 is indicated using reference numeral 22 and the front side of the duck 1 is indicated using reference numeral 23. FIGS. 1 and 2 show the carcass with the vent end 22 open. As is common in the art the body cavity 8 will be opened at the vent end 22, e.g. by an upstream vent opening device prior to the start of the evisceration process. This vent opening 24 is partly visible in FIG. 1.

Figure 3:
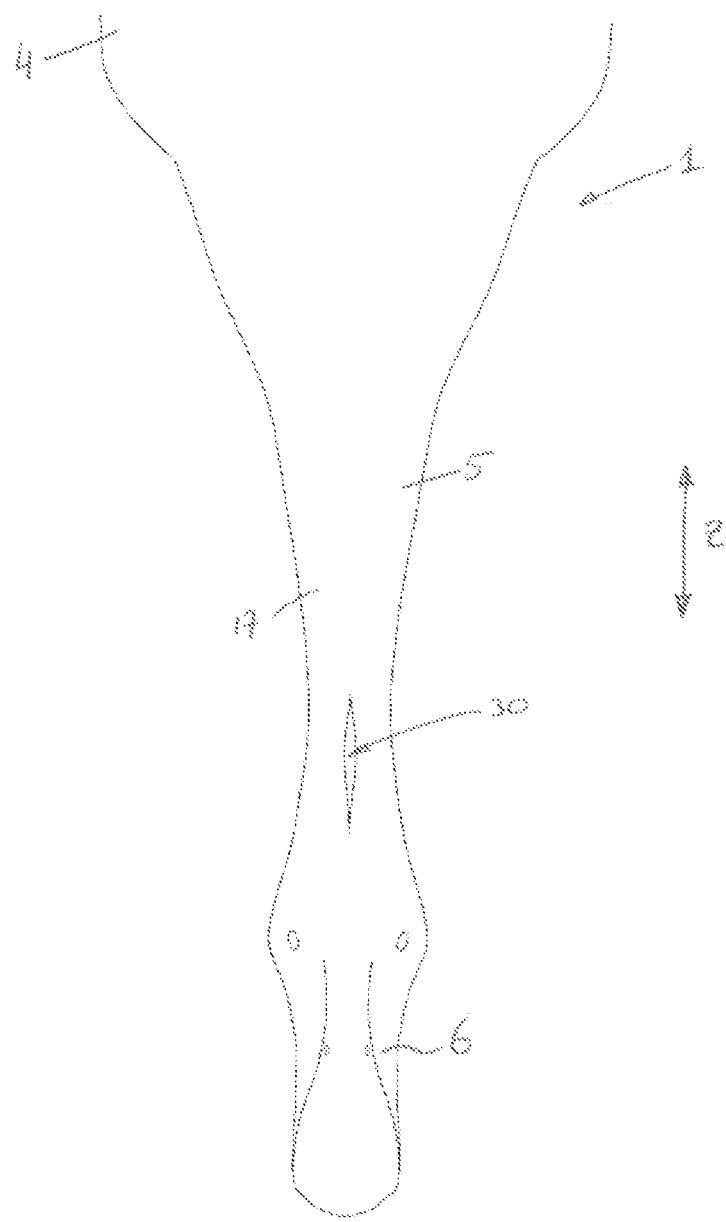
FIG. 3 schematically depicts a back side of the duck of FIG. 1 with a longitudinal cut in its neck.

Prior to removing the viscera pack, the first aspect of the invention requires the damaging of the skin 17 and esophagus 18. FIG. 3 schematically depicts a view of the back side 21 of the neck 5 of the duck 1 of FIG. 1 after undergoing the step of damaging skin 17 of the duck 1 at a back side 21 of the neck 5 of the duck 1 by making a cut 30 in the neck 5, preferably through the skin 17, in a direction parallel to a longitudinal axis of the neck 5, i.e. in this embodiment parallel to a Z-axis.

Figure 4:
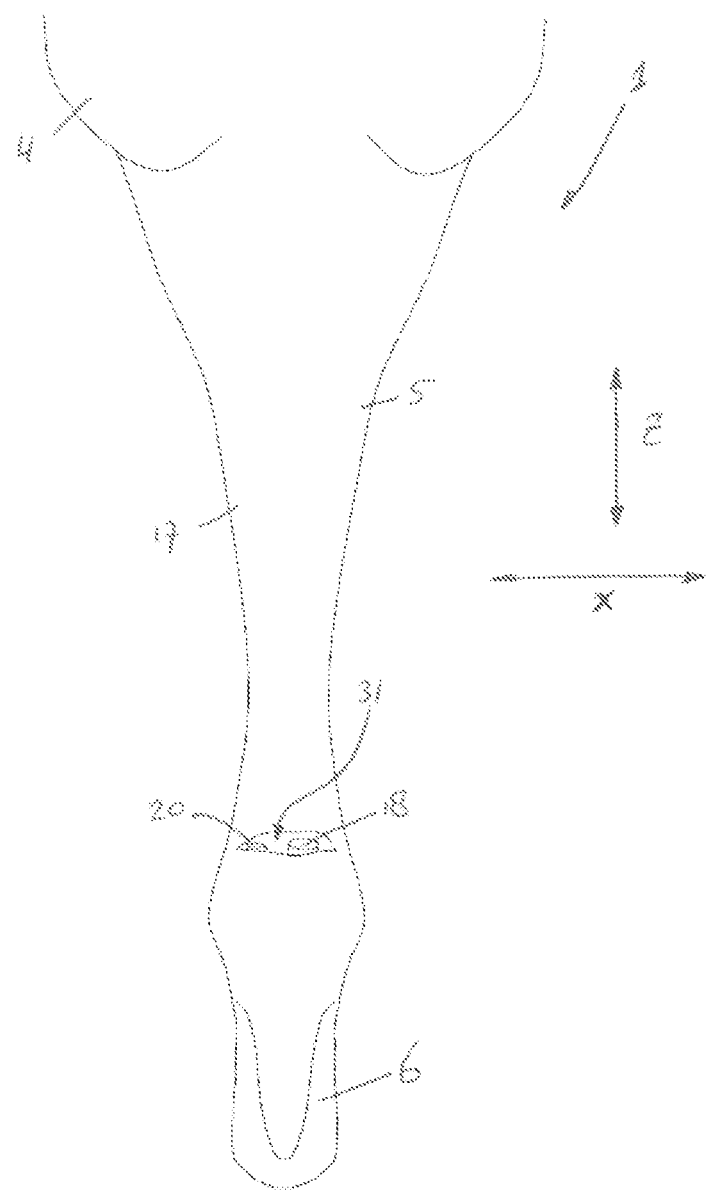
FIG. 4 schematically depicts a front side of the duck of FIG. 1 with a transverse cut near its head.

FIG. 4 schematically depicts a view of the front side 23 of the neck 5 of the duck 1 of FIG. 1 after undergoing the step of damaging the esophagus 18 of the duck 1 near the head 6 of the duck 1 by making a cut 31 in the neck 5, preferably through the skin 17 and preferably through the esophagus 18, in a direction perpendicular to the longitudinal axis of the neck 5, i.e. in this embodiment perpendicular to the Z-axis which is parallel to the X-axis.

The cut 30 may alternatively be referred to as a longitudinal cut and the cut 31 may alternatively be referred to as a transverse cut. The order in which the cuts 30, 31 are made is not relevant and can even be made simultaneously. More important is that the damage made by the cuts 30, 31 provides a reliable tearing or breaking location for both the skin in the neck 5 and esophagus 18 during the subsequent step, the result of which is depicted in FIG. 5.

Figure 5:
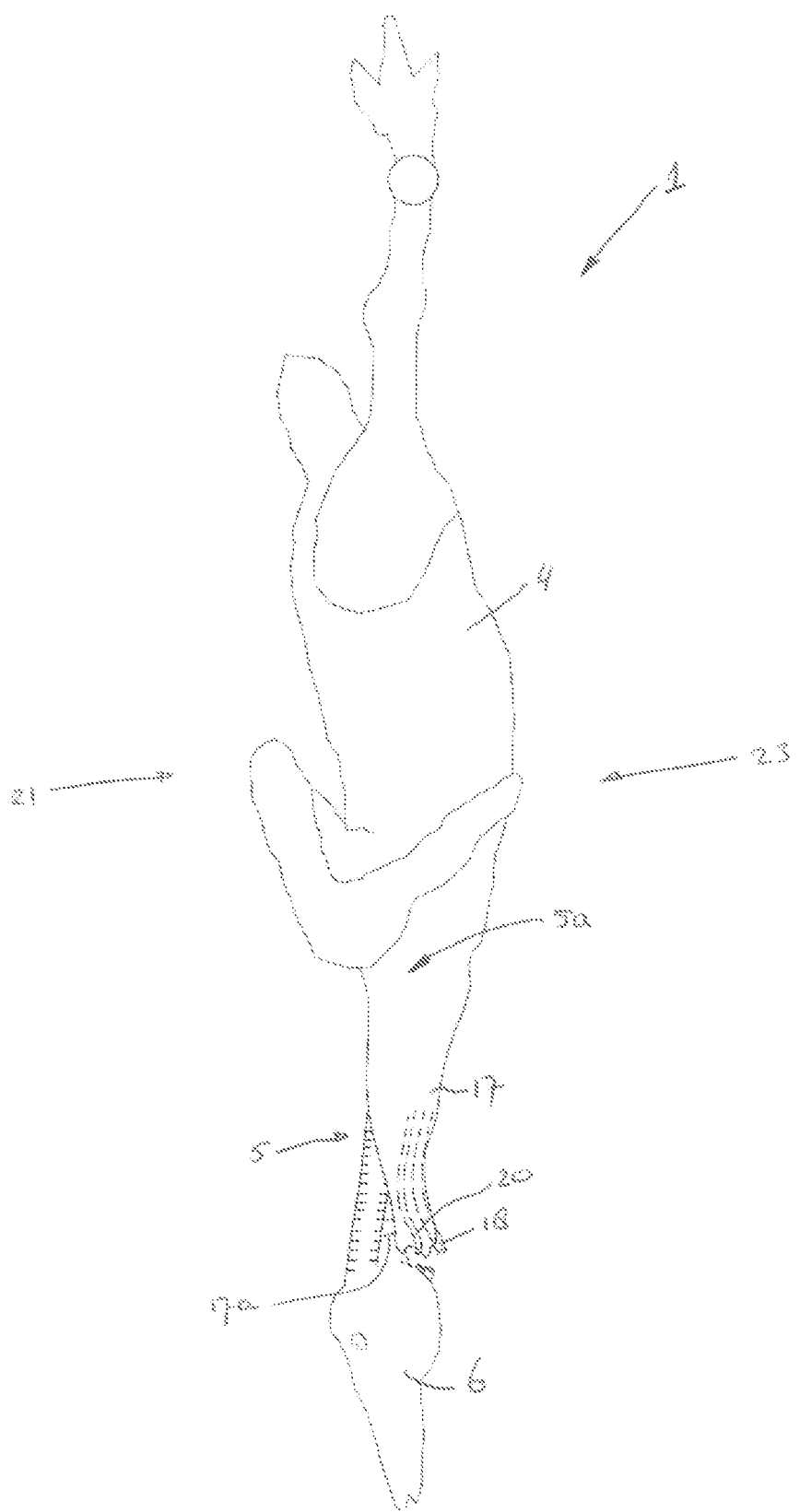
FIG. 5 schematically depicts a side view of the duck of FIG. 1 after removing the skin from the neck.

FIG. 5 schematically depicts a side view of the duck 1 of FIG. 1 after removing the skin 17 from the neck 5. The skin 17 is pulled towards the front side 23. The advantage of the longitudinal cut 30 at the back side 21 is that the skin 17 will be pulled at both sides of the neck 5 without leaving a portion behind. The esophagus 18 which is connected to the skin 17 at the front side 23 will be pulled along with the skin 17 due to the transverse cut 31. The same may apply to the trachea 20.

The skin 17 is removed from the neck 5, but preferably remains connected to the carcass at or near a base 5a of the neck 5, so that the esophagus 18 is still connected to the gizzard 14 and the trachea 20 are still connected to the lungs 19.

Any tissue connections 17a that may be present between the skin 17 and the neck 5 after removing the skin 17 are preferably severed, e.g. by using a tool or by simply increasing a distance between the skin 17 and the neck 5 thereby stretching the tissue connections 17a until they break.

Figure 6:
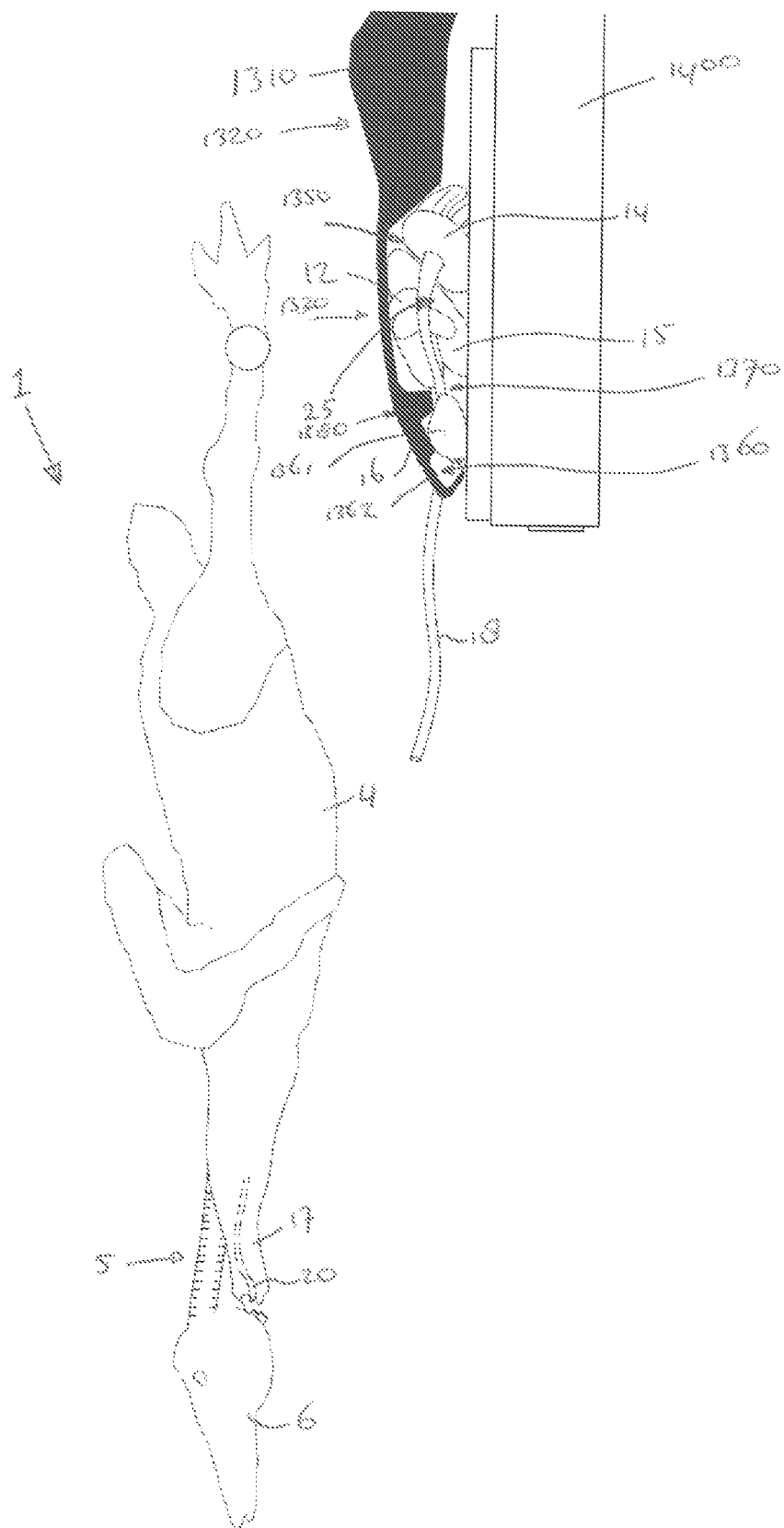
FIG. 6 schematically depicts a side view of the duck of FIG. 5 during removal of the viscera pack and esophagus.

The removal of the skin 17 along with the esophagus 18 from the neck 5 allows the esophagus 18 to be removed from the carcass along with the viscera pack. FIG. 6 schematically depicts a side view of the duck 1 after removal of the viscera pack 25. The viscera pack is preferably removed as a whole, including at least the organs connected to the esophagus 18, namely the intestines 12, gizzard 14, but preferably also including the liver 15, heart 16 and possibly the trachea 20 and/or lungs 19.

The viscera pack is removed via the vent opening 24, e.g. by entering the body cavity with a hand for manual removal or a collector device 1310 for mechanical removal and engaging with the viscera pack to pull the viscera pack upwards out of the body cavity via the vent opening 24. The upwards movement of the viscera pack will also apply pulling forces to the esophagus 18, which will then be peeled off of the skin 17 as a result of the esophagus being removed from the neck 5.

Figure 7:
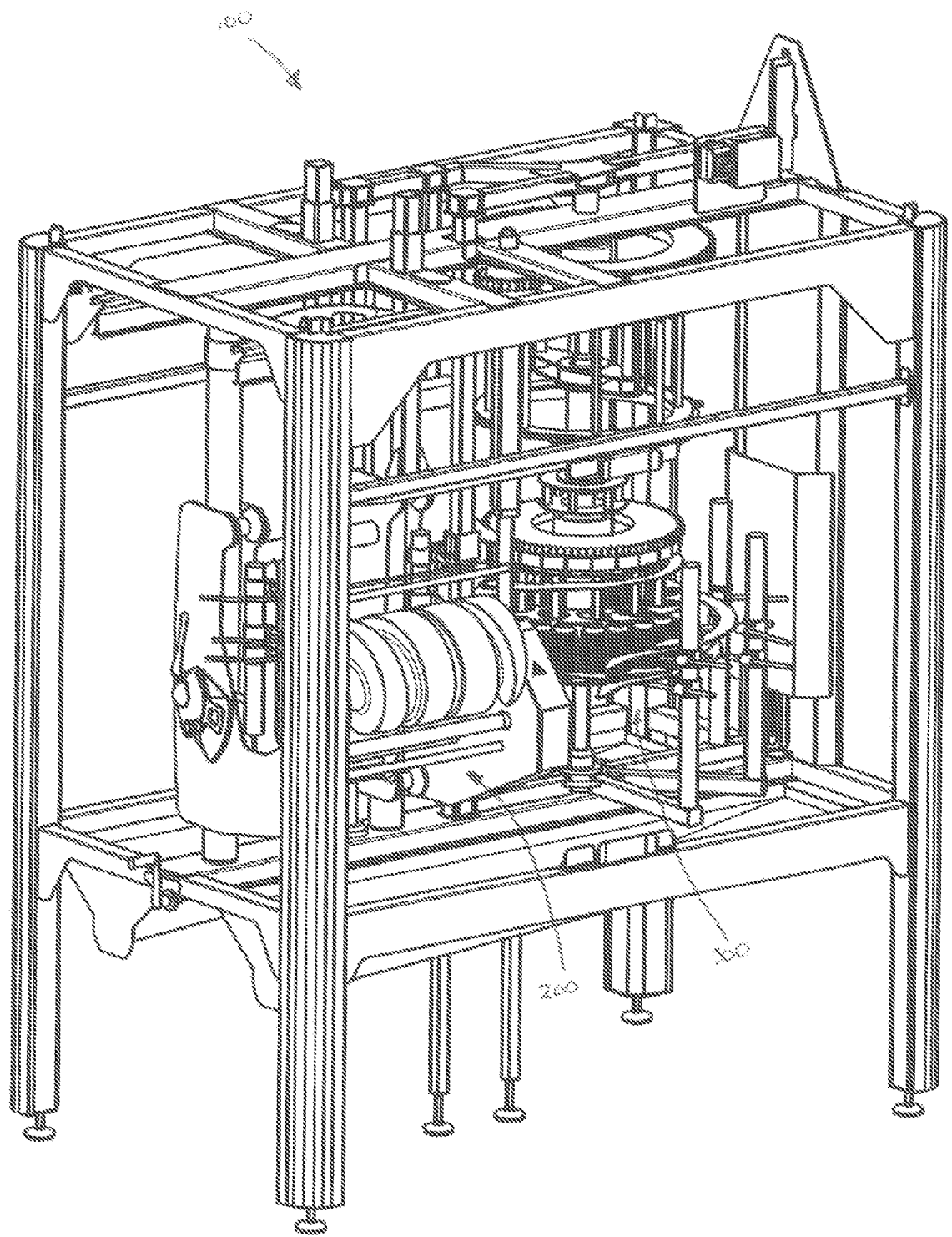
FIG. 7 schematically depicts a perspective view of a pre-eviscerating system according to an embodiment of the invention.

FIG. 7 schematically depicts a pre-eviscerating system 100 for preparing the duck 1 of FIG. 1 for eviscerating, i.e. carrying out the preparatory steps before removing the viscera pack 25. The pre-eviscerating system 100 includes a cutting machine 200 as a first station and downstream of the cutting machine 200 a second station 300 for skinning so that a duck 1 hanging upside down from the shackle 2 can be conveyed along the cutting machine 200 for cutting followed by the second station for skinning.

Figure 8:
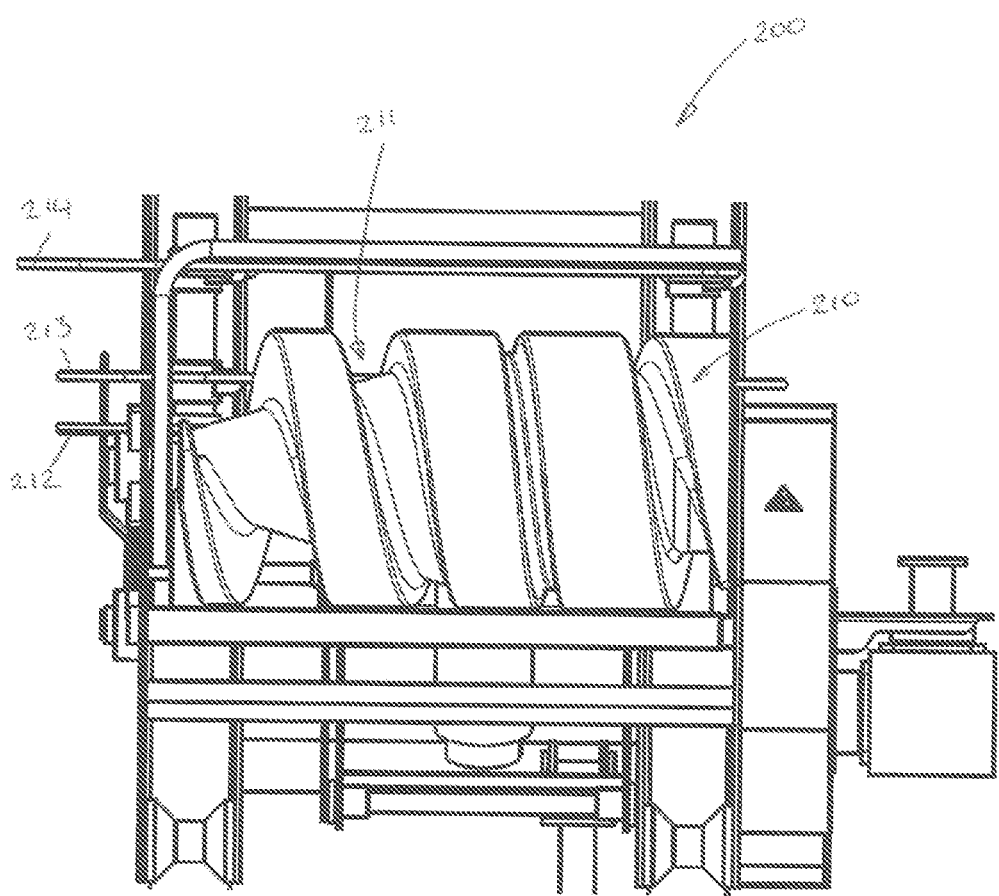
FIG. 8 schematically depicts a front view of the cutting machine in the pre-eviscerating system of FIG. 7.
Figure 9:
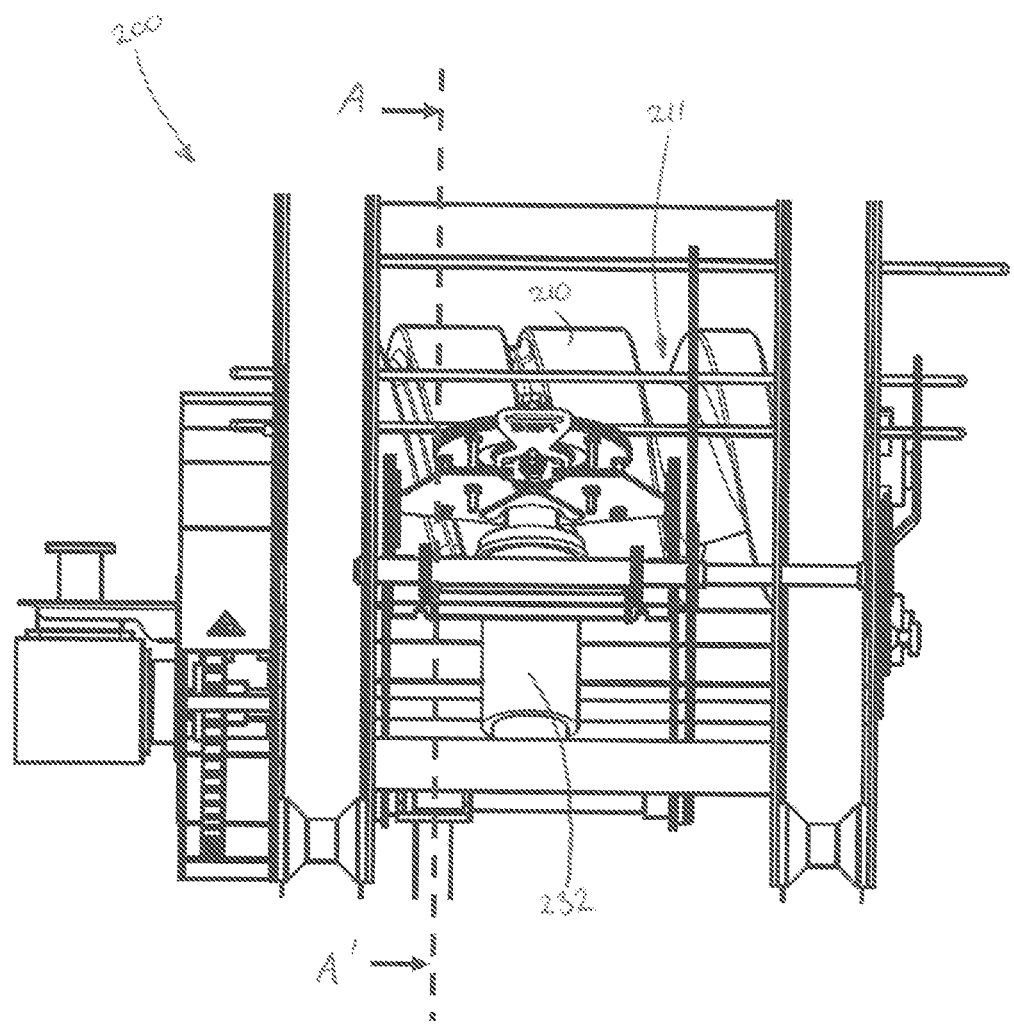
FIG. 9 schematically depicts a rear view of the cutting machine in the pre-eviscerating system of FIG. 7.
Figure 10:
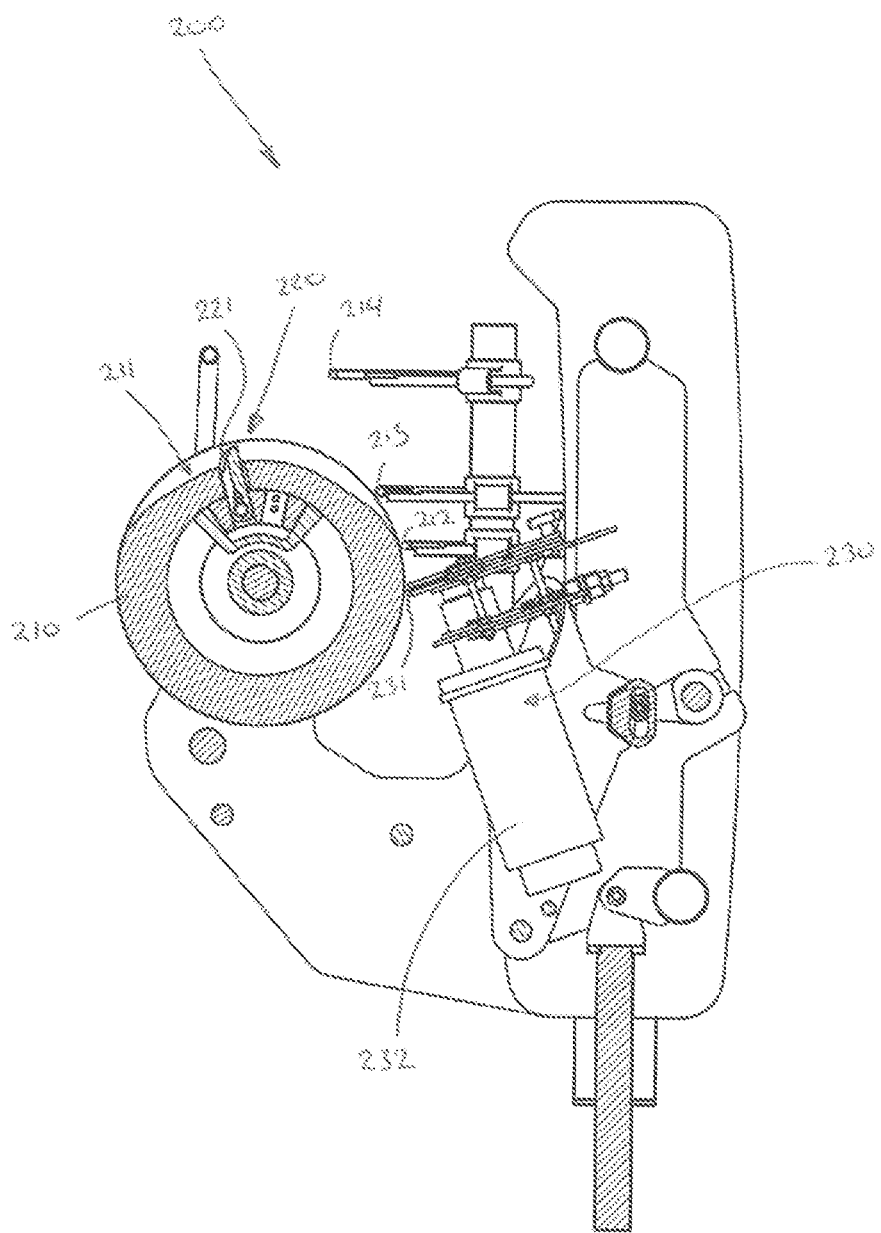
FIG. 10 schematically depicts a cross-sectional view of the cutting machine in the pre-eviscerating system of FIG. 7.

FIG. 8 schematically depicts a front view of the cutting machine 200 while FIG. 9 schematically depicts a rear view of the cutting machine 200 of the pre-eviscerating system 100 of FIG. 7. FIG. 10 indicates a cross-sectional view of the cutting machine 200 corresponding to a plane A-A' as indicated in FIG. 9.

The cutting machine 200 includes a drum 210 having a spiral groove 211 in the drum 210 to receive the neck 5 of a duck 1 suspended from a shackle 2 that is moved along the drum 210. The spiral groove 211 starts relatively wide at an entry side of the drum to catch and receive the neck 5. The entry side of the drum 210 is the left side of the drum 210 as shown in FIG. 8. The width of the groove reduces towards the center of the drum and then increases again towards the exit side of the drum 210, which exit side is opposite of the entry side and thus the right side of the drum 210 in FIG. 8. The relatively wide entry and exit sides of the spiral groove allow to receive and release the neck 5 of the duck 1 in an easy and smooth manner while the spiral groove in the center of the drum is configured to accurately position and thus retain the neck 5 of the duck to allow the longitudinal and transverse cuts 30, 31 to be made as will be explained below.

The neck 5 of the duck 1 is in this embodiment to be received inside the spiral groove 211 such that the back side 21 of the neck faces towards the drum and the front side 23 of the neck 5 faces away from the drum. The drum 210 is provided with a first cutting device 220 as clearly depicted in the cross section of FIG. 10. The first cutting device 220 includes a cutting knife 221 arranged inside the spiral groove 211 to rotate along with the drum 210, so that when neck 5 passes the drum with the neck in the spiral groove, a longitudinal cut will be made at the back side 21 of the neck 5 of the duck 1.

The neck 5 of the duck 1 is held in the correct position inside the spiral groove using three guiding bars 212, 213, 214. The guiding bar 212 engages with the neck of the duck 1. The guiding bar 213 engages with the neck of the duck above the guiding bar 212 at or near the body of the duck and the guiding bar 214 engages with a body of the duck. The guiding bars 212 and 213 prevent the neck of the duck from being pushed out of the spiral groove, especially during the making of the cut 30 as the knife may urge the neck out of the spiral groove.

The cutting machine 200 further includes a second cutting device 230 including a rotatable cutting blade 231 that can rotatably be driven by a drive 232. The cutting blade 231 is arranged such that the neck of the duck passes in between the drum and the cutting blade while being held in the spiral groove of the drum so that the cutting blade 231 is able to make a transverse cut 31. Again, the guiding bars 212, 213 and 214 along with the spiral groove keep the neck in place during the making of the cut.

The terms "first" and "second" as used in the first and second cutting devices 220 and 230 do not refer to the order in which the cutting devices are passed by the neck of the duck, but merely used to distinguish between the two cutting devices. In fact, in the embodiment shown in FIGS. 8-10, the second cutting device 230 is passed first by the neck of the duck so that the transverse cut is made prior to the longitudinal cut by the first cutting device.

Hence, in summary, the cutting machine comprises a first cutting device configured for damaging skin of the poultry at a back side of the neck of the poultry, and a second cutting device configured for damaging an esophagus of the poultry at or near the head of the poultry. In this example, the first and second cutting devices are combined in a single cutting machine, but they may also be provided separately and/or in any order.

Figure 11:
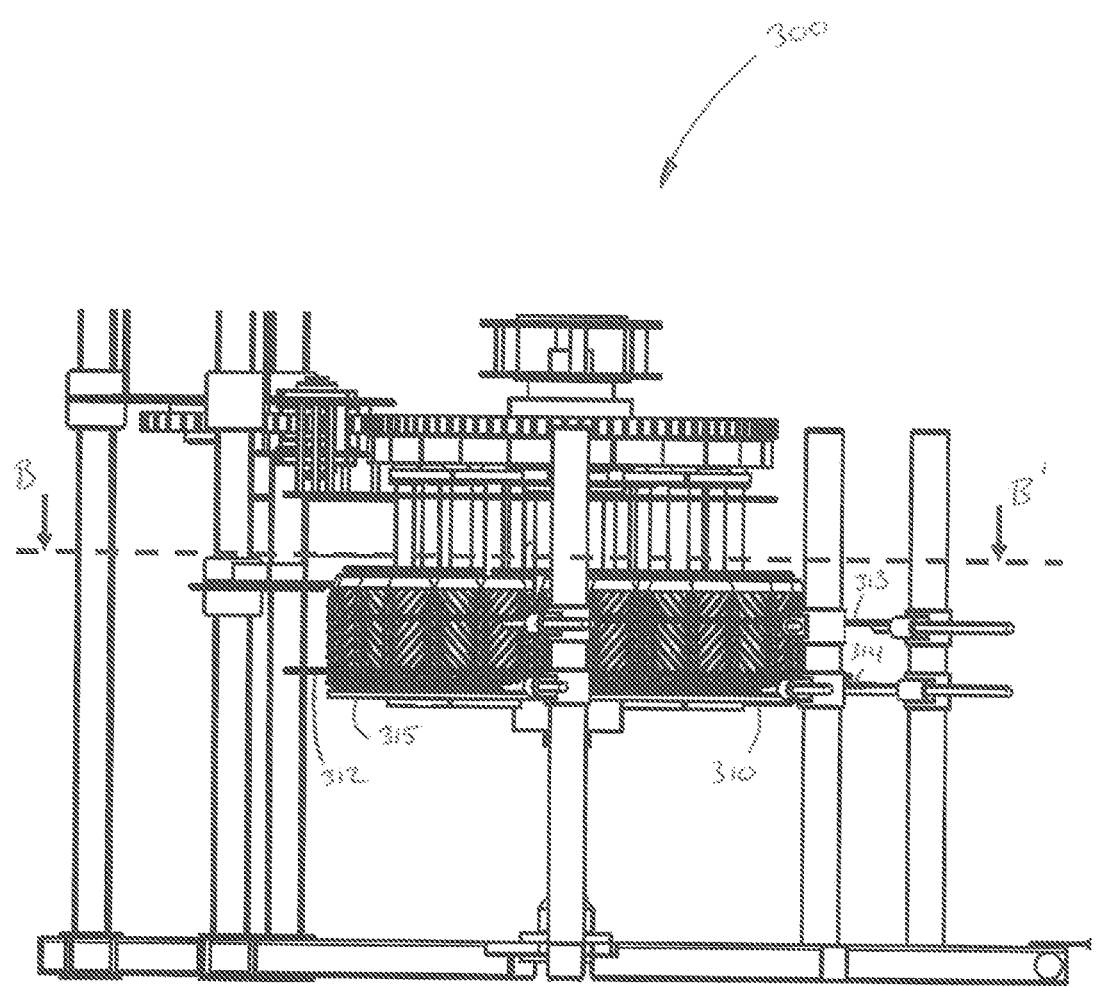
FIG. 11 schematically depicts a front view of the second station in the pre-eviscerating system of FIG. 7.
Figure 12A:
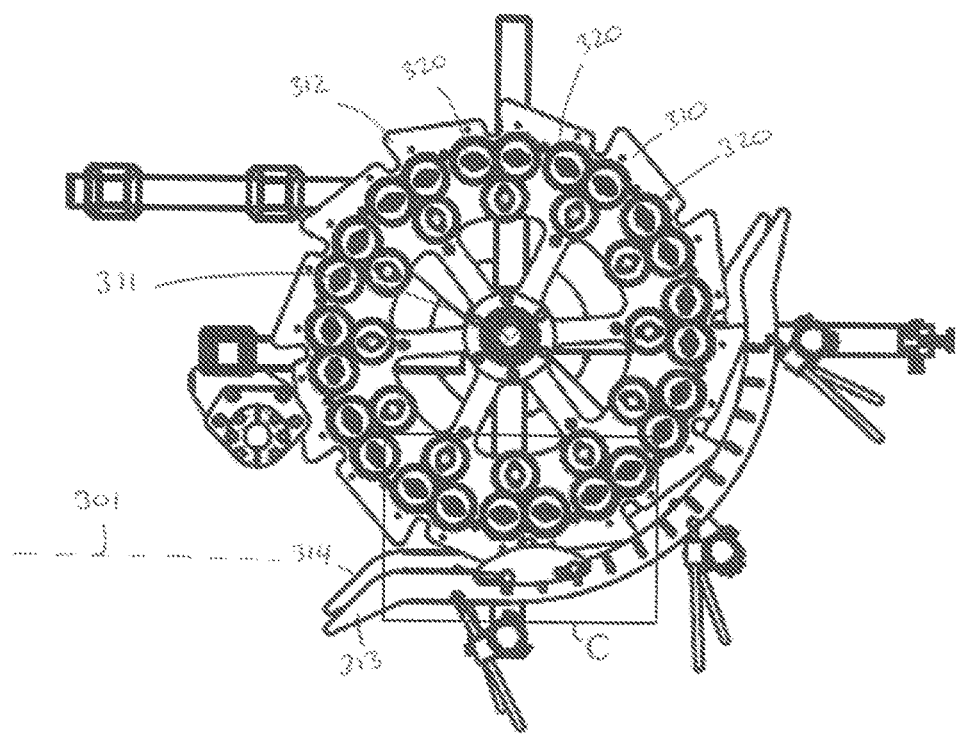
FIG. 12A schematically depicts a cross-sectional view of the second station in the pre-eviscerating system of FIG. 7.
Figure 12B:
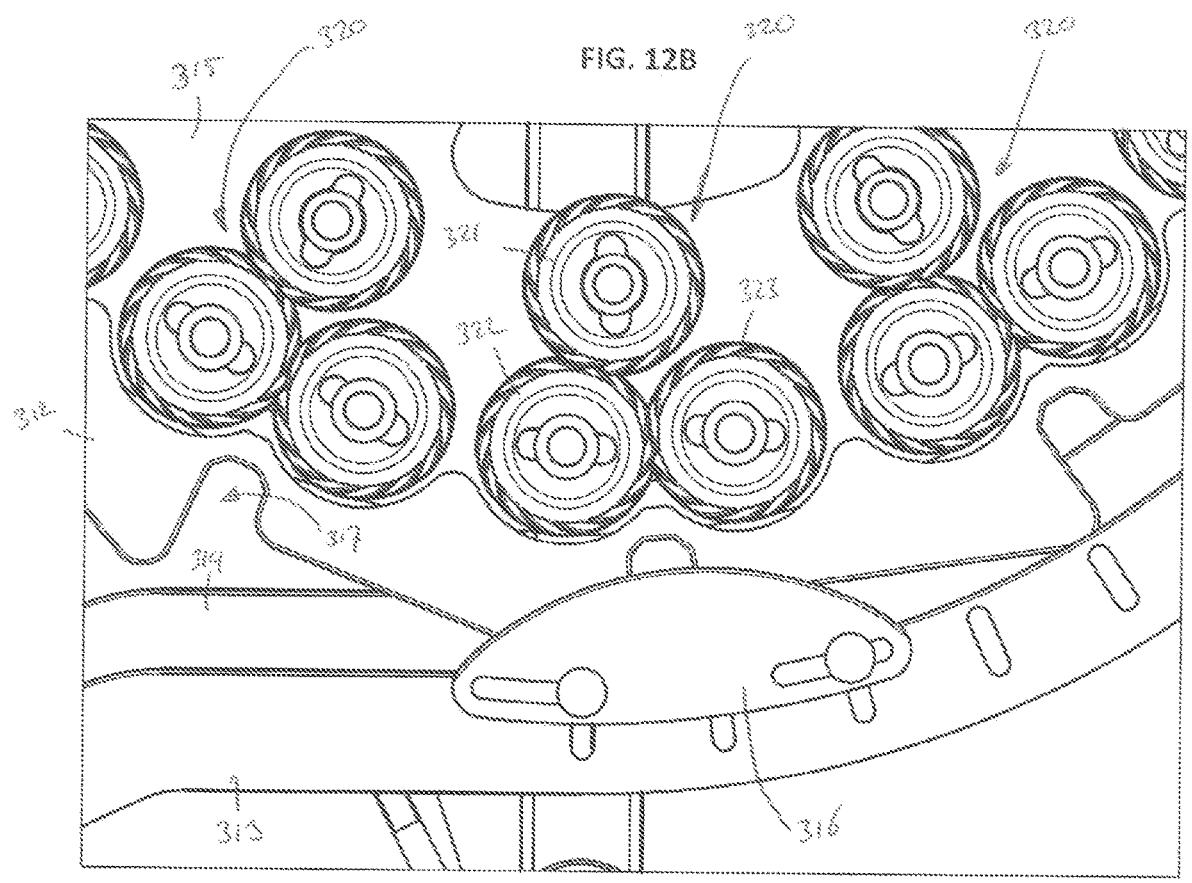
FIG. 12B schematically depicts in more detail a part of the view of FIG. 12A.

The pre-eviscerating system 100 further includes the second station 300. FIG. 11 schematically depicts a front view of the second station 300. FIG. 12A schematically depicts a cross-sectional view of the second station 300 corresponding to a plane B-B' as depicted in FIG. 11. FIG. 12B schematically depicts in more detail the part of the second station shown in rectangle C in FIG. 12A.

The second station 300 includes a turntable 310 configured to rotate about a substantially vertical rotation axis 311, which turntable 310 includes a plurality of skinning devices 320 provided on a base plate 315. The plurality of skinning devices 320 allow to process a plurality of ducks 1 suspended from shackles 2 more or less simultaneously. To this end, the shackles 2 are moved synchronous with the turntable 310. The ducks 1 are transported from the cutting machine 200 towards the second station 300 along a conveyance path 301. Upon reaching the second station 300, the duck 1 is engaged by a stationary upper guiding bar 313 and a stationary lower guiding bar 314 guiding the duck 1 and in particular the neck 5 towards the skinning devices 320 on the turntable.

The turntable 310 includes a neck capture plate 312 that rotates along with the skinning devices 320 and includes a recess 317 to receive a neck of the duck 1 at a location just below the head when seen from a duck point of view, i.e. at a location just above the head when seen from an external observer point of view looking at the duck being suspended upside down. The lower guiding bar 314 is used to guide the neck of the duck into the recess 317. The recess 317 is preferably dimensioned such that a head of a duck is not able to pass the recess in a direction parallel to the longitudinal axis of the neck, so that the lower guiding bar 314 and the neck capture plate 312 capture the head of the duck and keep it in place relative to the skinning device 320 during the processing of the duck 1.

The upper guiding bar 313 is configured to guide the neck and initially keeps an appropriate distance between the neck and the skinning device 320 until the neck reaches a guiding plate 316 arranged on the guiding bar 313 and extending towards the skinning device 320 to bring the neck into contact with the skinning device and start the skinning process of removing the skin from the neck as described above.

Each skinning device 320 on the turntable includes three rollers which include a first roller 321, a second roller 322 and a third roller 323 all rotatably arranged to rotate about a vertical rotating axis. Preferably, as in this embodiment, a single drive is provided to drive a relatively large gear, which gear is configured to drive rotation of all first rollers 321 of the skinning devices 320. The first rollers 321 and second rollers 322 are in turn connected to each other such that the first rollers drive rotation of the second rollers and the second rollers 322 are in turn connected to the third rollers 323 in such a way that the second rollers drive rotation of the third rollers.

In this embodiment, the first, second and third rollers are embodied as helical gears, wherein the second and third roller mesh to allow the second roller to drive rotation of the third roller, but with sufficient room in between the second and third rollers to allow the skin to be grabbed and moved in between the second and third rollers to an opposite side of the pair of second and third rollers.

Seen from above, corresponding to the view in FIG. 12B, the third roller 323 is rotated clockwise while the second roller is rotated counterclockwise. From this perspective, the third roller is a right-handed helical gear while the second roller is a left-handed helical gear.

The first roller 321 is then also rotated clockwise and is also a right-handed helical gear similar to the third roller, so that the pair of first and second rollers has a similar working principle as the pair of the second and third rollers and thus the skin of the neck of the duck is first grabbed by the pair of second and third rollers and then moved towards the pair of first and second rollers where this pair also grabs the skin and further increases the distance between skin and neck to severe any tissue connections between skin and neck that were still present after grabbing the skin with the pair of second and third rollers.

Figure 13:
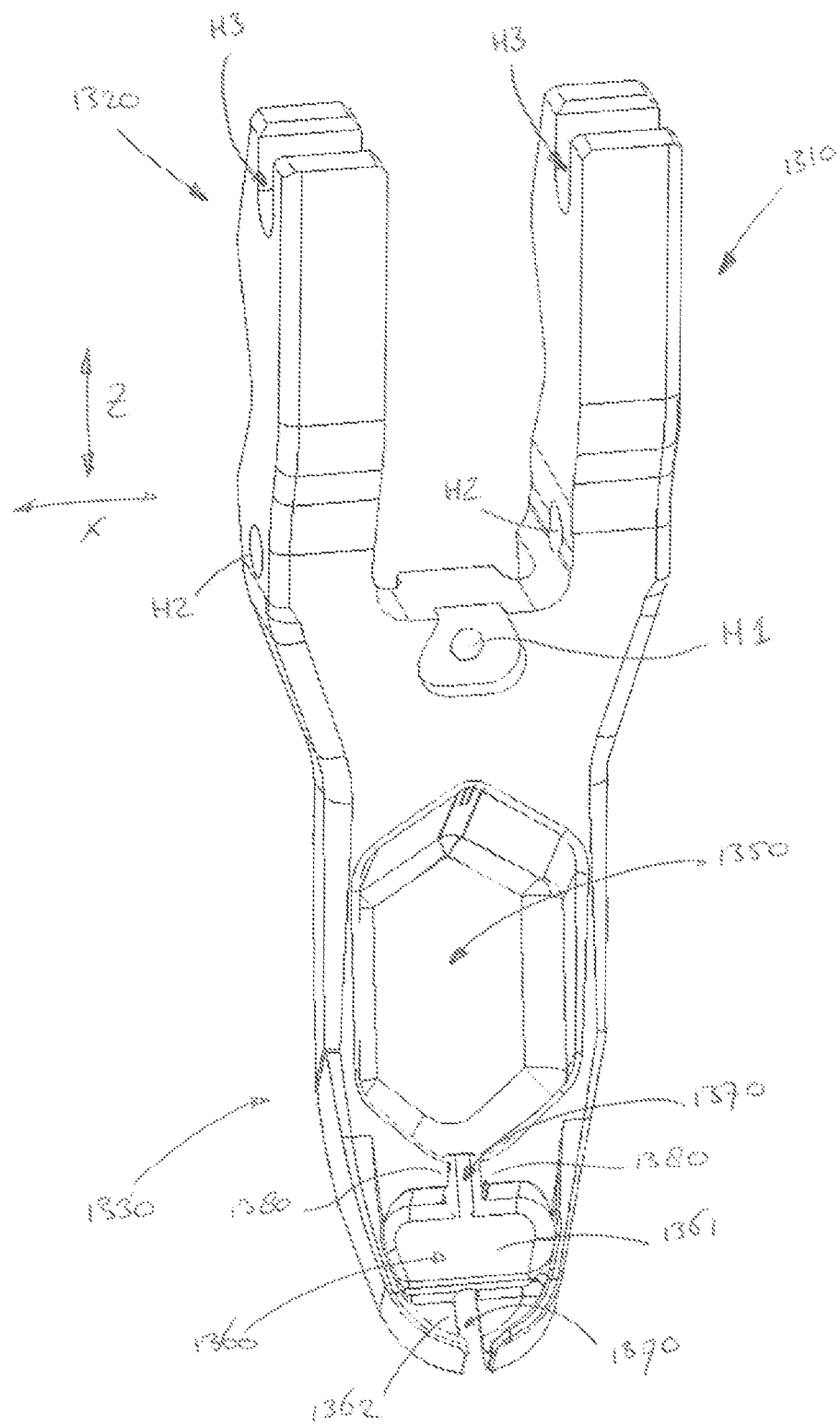
FIG. 13 schematically depicts a perspective view of a collector device of an eviscerating device.

FIG. 13 depicts a collector device 1310 according to an embodiment according to the second aspect of the invention. The collector device 1310 includes a manipulation part 1320 and a collector part 1330 arranged at opposite sides of the collector device 1310.

The manipulation part 1320 is the part that connects the collector device to an evisceration machine and allows the collector device to be manipulated, i.e. positioned and moved, relative to the carcass of the poultry. This may include up and downward movements parallel to the Z-direction and/or rotations about a rotation axis parallel to the X-direction.

The collector part 1330 is the part of the collector device 1310 that is introduced into the body of the carcass, e.g. via the vent opening 24, and engages with the viscera pack 25 to remove the viscera pack from the body 4.

In this embodiment, the collector part 1330 includes a first recess 1350 and a second recess 1360, wherein the first recess 1350 and the second recess 1360 are aligned in a longitudinal direction of the collector device 1310, which longitudinal direction in FIG. 13 extends substantially parallel to the Z-direction, with the first recess 1350 being arranged closer to the manipulation part 1320 than the second recess 1360.

The first recess 1350 is configured to hold at least the gizzard, intestines and the liver of the viscera pack while the second recess 1360 is configured to hold at least the heart. In between the first and second recess a bridging recess 1370 is provided that extends from the first recess 1350 through a wall 1380 to the second recess 1360. An advantage of the bridging recess 1370 is that it allows to receive the esophagus from the poultry and thus allows the esophagus to extend from the gizzard in the first recess 1350 to the second recess via the bridging recess 1380 with less risk of damaging the esophagus during removal of the viscera pack.

The collector part 1330 at its free end further includes a slit 1390 extending into the second recess 1360 thereby allowing the esophagus to extend from the second recess to below the collector device and thus allows to remove the esophagus up to the damaging location at or near the head of the poultry as described above with less change of damaging the esophagus at another intermediate location.

The wall 1380 preferably forms a V-shaped side wall in the first recess allowing to properly hold the portion of the viscera pack to be received in the first recess.

The second recess 1360 preferably includes two portions, namely a first portion 1361 having a first depth and a second portion 1362 having a second depth, wherein the first depth is smaller than the second depth, and wherein preferably the second portion 1362 comprises the slit 1390. The first depth is preferably equal or substantially equal to a corresponding depth of the first and/or bridging recess.

Preferably all edges of the collector part engaging with the poultry are rounded to minimize damage to the viscera pack.

Reference is also made to FIG. 6 in which a cross-section of the collector device 1310 is depicted including the first recess 1350, the second recess 1360 with the first portion 1361 and the second portion 1362, and the side wall 1380 with the bridging recess 1370. FIG. 6 also depicts a counter element 1400 to cooperate with the collector device 1310 after removal of the viscera pack 25 from the poultry and preventing the viscera pack from leaving the first and second recesses of the collector device. The counter element 1400 may be a box to eventually receive the viscera pack from the collector device for further processing.

FIGS. 14A and 14B depict a collector device 1410 according to another embodiment according to the second aspect of the invention. FIG. 14B depicts a front view, while FIG. 14A depicts a cross-sectional view in accordance with a plane indicated by dotted line A-A in FIG. 14B.

The collector device 1410 includes a manipulation part 1420 and a collector part 1430 arranged at opposite sides of the collector device 1410.

The manipulation part 1420 is the part that connects the collector device 1410 to an evisceration machine and allows the collector device 1410 to be manipulated, i.e. positioned and moved, relative to the carcass of the poultry. This may include up and downward movements parallel to the Z-direction and/or rotations about a rotation axis parallel to the X-direction.

The collector part 1430 is the part of the collector device 1410 that is introduced into the body of the carcass, e.g. via the vent opening 24, and engages with the viscera pack 25 to remove the viscera pack from the body 4.

The collector part 1430 includes a first recess 1450 and a second recess 1460, wherein the first recess 1450 and the second recess 1460 are aligned in a longitudinal direction of the collector device 1410, which longitudinal direction in FIGS. 14A and 14B extends substantially parallel to the Z-direction, with the first recess 1450 being arranged closer to the manipulation part 1420 than the second recess 1460.

The first recess 1450 is configured to hold a part of the viscera pack, such as the gizzard, intestines and liver, while the second recess 1460 is configured to hold at least the heart. In between the first 1450 and second 1460 recess, a bridging recess 1470 is provided that extends from the first recess 1450 through a wall 1480 to the second recess 1460.

The collector part 1430 includes, at its free end, a slit 1490 extending into the second recess 1460 thereby allowing the esophagus to extend from the second recess 1460 to below the collector device 1410 and thus allows to remove the esophagus up to the damaging location at or near the head of the poultry as described above.

An important difference with the embodiment of FIG. 13 is that the second recess 1460 in the embodiment of FIGS.

14A and 14B has a flat bottom surface while the embodiment of FIG. 13 has two portions with different depths.

Another difference, assuming that the manipulator parts are identical or at least similar in size, may be that the collector part 1430 is larger than collector part 1330 making the collector device 1410 more suitable for removing the viscera pack of larger poultry.

Again, preferably all edges of the collector part 1430 engaging with the poultry are rounded to minimize damage to the viscera pack.

FIGS. 15A and 15B depict a collector device 1510 according to a further embodiment according to the second aspect of the invention. FIG. 15B depicts a front view, while FIG. 15A depicts a cross-sectional view in accordance with a plane indicated by dotted line A-A in FIG. 15B.

The collector device 1510 includes a manipulation part 1520 and a collector part 1530 arranged at opposite sides of the collector device 1510.

The manipulation part 1520 is the part that connects the collector device 1510 to an evisceration machine and allows the collector device 1510 to be manipulated, i.e. positioned and moved, relative to the carcass of the poultry. This may include up and downward movements parallel to the Z-direction and/or rotations about a rotation axis parallel to the X-direction.

The collector part 1530 is the part of the collector device 1510 that is introduced into the body of the carcass, e.g. via the vent opening 24, and engages with the viscera pack 25 to remove the viscera pack from the body 4.

The collector part 1530 includes a first recess 1550 and a second recess 1560, wherein the first recess 1550 and the second recess 1560 are aligned in a longitudinal direction of the collector device 1510, which longitudinal direction in FIGS. 15A and 15B extends substantially parallel to the Z-direction, with the first recess 1550 being arranged closer to the manipulation part 1520 than the second recess 1560.

The first recess 1550 is configured to hold a part of the viscera pack, such as the gizzard, intestines and liver, while the second recess 1560 is configured to hold at least the heart. In between the first 1550 and second 1560 recess, a bridging recess 1570 is provided that extends from the first recess 1550 through a wall 1580 to the second recess 1560.

The collector part 1530 includes, at its free end, a slit 1590 extending into the second recess 1560 thereby allowing the esophagus to extend from the second recess 1560 to below the collector device 1510 and thus allows to remove the esophagus up to the damaging location at or near the head of the poultry as described above.

The second recess 1560 includes two portions, namely a first portion 1561 having a first depth and a second portion 1562 having a second depth, wherein the first depth is smaller than the second depth, and wherein the second portion 1562 comprises the slit 1590, i.e. the slot 1590 does not extend into the first portion 1561.

A main difference with the embodiment of FIG. 13, assuming that the manipulator parts are identical or at least similar in size, may be that the collector part 1530 is smaller than the collector part 1330 making the collector device 1510 more suitable for removing the viscera pack of smaller poultry.

Again, preferably all edges of the collector part 1530 engaging with the poultry are rounded to minimize damage to the viscera pack.

Hence, in an embodiment, the eviscerating device may be used with any of the shown collector devices, wherein the collector device 1510 of FIGS. 15A and 15B is used for small-size poultry, the collector device 1310 of FIG. 13 is used for medium-size poultry and the collector device 1410 of FIGS. 14A and 14B is used for large-size poultry, wherein the poultry may be the same species and the collector devices are used to deal with the variations in size of the species, or the collector devices are used for different species of poultry.

As an example of the possible variations, a plurality of dimensions are discussed by reference to the FIGS. 13-15B and the above described distinction between small-, medium-, and large-size poultry.

A length of the collector part of the collector device may be defined as the dimension in longitudinal direction, in this case parallel to the Z-direction, between the free end of the collector part and the beginning of the first recess as indicated by reference symbol L in FIGS. 14A and 15A.

A width of the collector part of the collector device may be defined as the dimension in width direction, in this case parallel to the X-direction, as indicated by reference symbol W1 in FIGS. 14B and 15B.

A thickness of the collector part of the collector device may be defined as the dimension in thickness direction, in this case parallel to the Y-direction, as indicated by reference symbol T in FIGS. 14A and 15A.

A depth of the first recess of the collector part may be defined as the dimension perpendicular to a neighboring surface between a bottom of the first recess and the neighboring surface, as indicated by reference symbol D1 in FIGS. 14A and 15A.

A depth of the second recess of the collector part may be defined as the dimension perpendicular to a neighboring surface between a bottom of the second recess and the neighboring surface, as indicated by reference symbol D2 in FIGS. 14A and 15A.

A width of the first recess of the collector part may be defined as the dimension in width direction, in this case parallel to the X-direction, as indicated by reference symbol W2 in FIGS. 14B and 15B.

A width of the bridging recess of the collector part may be defined as the dimension in width direction, in this case parallel to the X-direction, as indicated by reference symbol W3 in FIGS. 14B and 15B.

A width of the slit of the collector part may be defined as the dimension in width direction, in this case parallel to the X-direction, as indicated by reference symbol W4 in FIGS. 14B and 15B.

Below, a table is indicated with exemplary ranges for the different collector devices:

| Dimension | Small-size | Medium-size | Large-size |
| --- | --- | --- | --- |
| L  | 120-160 mm | 140-180 mm | 160-200 mm |
| W1 | 30-90 mm   | 60-120 mm  | 90-150 mm  |
| W2 | 10-70 mm   | 40-100 mm  | 70-130 mm  |
| W3 | 4-9 mm     | 8-12 mm    | 10-15 mm   |
| W4 | 4-9 mm     | 8-12 mm    | 10-15 mm   |
| T  | 40-60 mm   | 55-75 mm   | 70-90 mm   |
| D1 | 10-40 mm   | 25-55 mm   | 40-70 mm   |
| D2 | 5-12 mm    | 8-17 mm    | 13-20 mm   |

When the second recess of the collector device has two different portions with two different depths, namely a first depth for a first portion and a second depth for a second portion, as is the case for the collector devices of FIGS. 13, 15A and 15B, the ratio between the first and second depth (first depth/second depth) is at most 0.8, preferably 0.7, more preferably 0.6, and most preferably at most 0.5.

Although not essential to the second aspect of the invention, the manipulation device may include a hole, depicted using reference symbol H1 in FIGS. 13, 14B and 15B, that may be used to lower and lift the respective collection device and/or may be used to provide a rotation axis allowing to rotate the respective collection device about a Y-direction extending perpendicular to both the X- and Z-directions.

Although not essential to the second aspect of the invention, the manipulation device may include one or more holes, depicted using reference symbols H2 in FIGS. 13, 14A and 15A, that may be used to lower and lift the respective collection device and/or may be used to provided a rotation axis allowing to rotate the respective collection device about the X-direction.

Although not essential to the second aspect of the invention, the manipulation device may include one or more holes or recesses, depicted using reference symbols H3 in FIGS. 13, 14A and 15A, that may be used to move the portion of the manipulation device that includes the one or more holes or recesses H3 in Y-direction, e.g. to rotate the respective collection device about the X-direction which possibility may be provided by the holes H2 described above.

The invention claimed is:

1. A method to eviscerate poultry having a carcass with body, neck and head, said method comprising:
   damaging skin of the poultry at a back side of the neck of the poultry;
   damaging an esophagus of the poultry at or near the head of the poultry;
   simultaneously removing skin from the neck of the poultry and the esophagus; and
   removing a viscera pack from the poultry along with the esophagus removed from the neck of the poultry.

2. The method according to claim 1, wherein damaging the skin comprises making a cut or slit in the skin in a direction parallel to a longitudinal direction of the neck of the poultry.

3. The method according to claim 1, wherein damaging the esophagus comprises making a cut or slit at a front side of the neck of the poultry in a direction perpendicular to a longitudinal direction of the poultry.

4. The method according to claim 1, wherein after removing the skin from the neck, any remaining tissue connections between skin and neck other than the esophagus are severed.

5. The method according to claim 1, wherein during removal of the skin from the neck, the head of the poultry is fixated.

6. The method according to claim 1, wherein the trachea is also damaged, and wherein the trachea is also pulled along with the skin.

7. The method according to claim 6, wherein during removal of the viscera the lungs and trachea remain inside the poultry.

8. A pre-eviscerating system for preparing poultry having a carcass with a body, neck and head for evisceration, said pre-eviscerating system comprising:
   a first cutting device for damaging skin of the poultry at a back side of the neck of the poultry;
   a second cutting device for damaging an esophagus of the poultry at or near the head of the poultry; and
   a skinning device for removing skin from the neck of the poultry thereby pulling the esophagus along with the removed skin.

9. An evisceration system for eviscerating poultry having a carcass with a body, neck and head, said system comprising: a pre-eviscerating system according to claim 8; and an eviscerating device for removing a viscera pack from the poultry along with the esophagus removed along with the skin in the skinning device.

10. The system according to claim 8, wherein the first cutting device and the second cutting device are combined in a single cutting machine.

11. A collector device for collecting a viscera pack from poultry having a carcass with a body, said collector device comprising:
   a manipulation part to move and position the collector device relative to the poultry; and
   a collector part arranged opposite to the manipulation part to engage with the viscera pack of the poultry,
   wherein the collector part comprises a first recess and a second recess, said first and second recess being aligned in a longitudinal direction of the collector device with the first recess being arranged closer to the manipulation part than the second recess, and
   wherein the collector part further comprises a bridging recess in a wall between the first and second recess extending from the first recess to the second recess.

12. The collector device according to claim 11, wherein the collector part further comprises a slit at a free end of the collector part that extends in the longitudinal direction of the collector device from the free end into the second recess.

13. The collector device according to claim 11, wherein the wall between the first and second recess forms a V-shaped side wall of the first recess.

14. The collector device according to claim 11, wherein the second recess includes a first position having a first depth and a second portion having a second depth, wherein the first depth is smaller than the second depth, and the first portion is closer to the first recess than the second portion.

15. The collector device according to claim 14, wherein the slit extends from the free end into the second portion of the second recess only.

16. The collector device according to claim 11, wherein the edges of the collector part engaging with the poultry are rounded.

* * * * *